April 2, 1968     C. C. FREEMAN     3,375,808

CARTON FOR INSECTS

Filed July 11, 1966

Inventor
Claude C. Freeman
By Higgs, Carpenter & Lind
Attorney

United States Patent Office 3,375,808
Patented Apr. 2, 1968

3,375,808
CARTON FOR INSECTS
Claude C. Freeman, Mansfield, Tex., assignor to Container Corporation of America, Chicago, Ill., a corporation of Delaware
Filed July 11, 1966, Ser. No. 564,176
6 Claims. (Cl. 119—19)

This invention relates to a carton for insects and more particularly, to a carton having a removable insert for providing a plurality of large area surfaces to which the insects can adhere and additionally for supporting a container for insect food.

Various insect control programs conducted throughout various parts of the country have found that some insects can be controlled or eliminated by importing other insects to the area and releasing them. The imported insects are predatory toward the insects sought to be controlled, and in time a balanced situation can commonly be reached.

This invention relates to a carton suitable for insects, and includes a vented body structure for confining the insects and a tubular insert positioned therein and defining a plurality of large area surfaces to which the insects can adhere and further defining means for holding a container for insect food. Thus, insects confined in this carton can be sustained for extended periods of time incident to their being shipped to the area desired and being ultimately released.

Accordingly, the object of this invention is to provide a carton construction suitable for confining, and sustaining in confinement, a plurality of insects.

Another object of this invention is to provide a carton having a significantly large ratio of interior surfaces to the interior volume, so that the insects confined in the carton can adhere to the interior surfaces.

Another object of this invention is to provide a carton having holding means for confining in place a container having appropriate insect food.

These and other objects will be more fully appreciated after reference to the accompanying drawing wherein.

Figure 1:
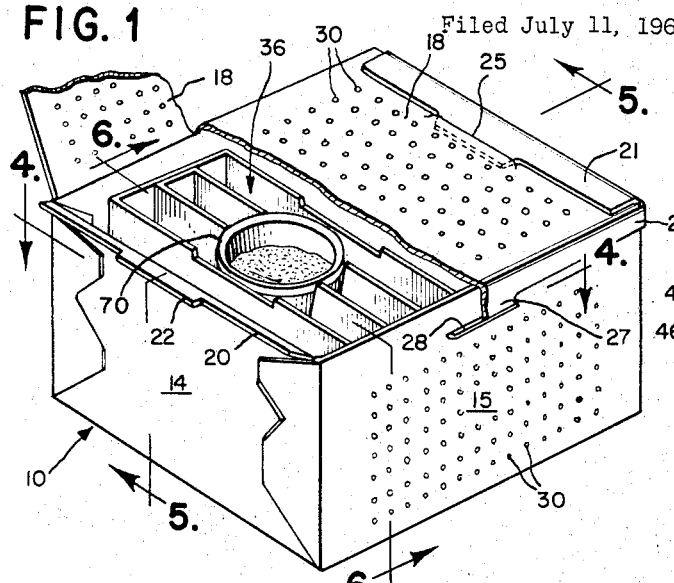
FIG. 1 is a perspective view of an opened carton having an embodiment of the subject invention.
Figure 5:
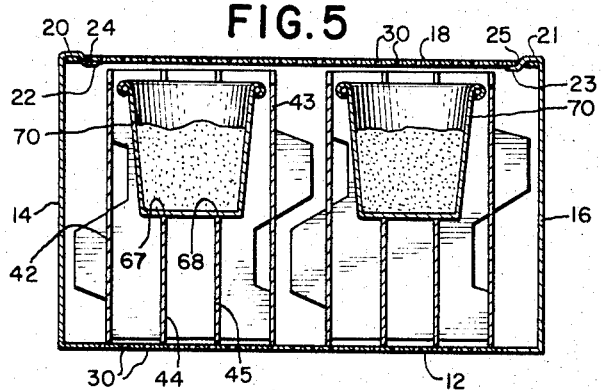
Figure 4:
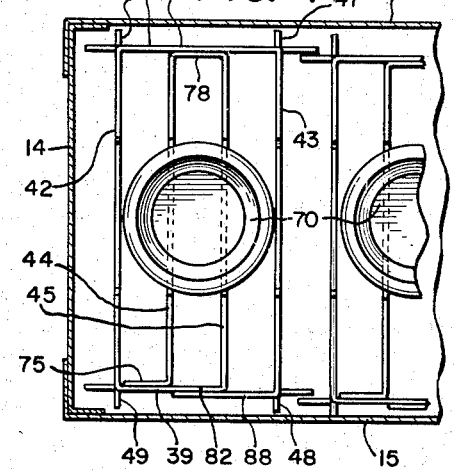
FIG. 4 is a top plan view of a portion of the carton of FIG. 1.
Figure 6:
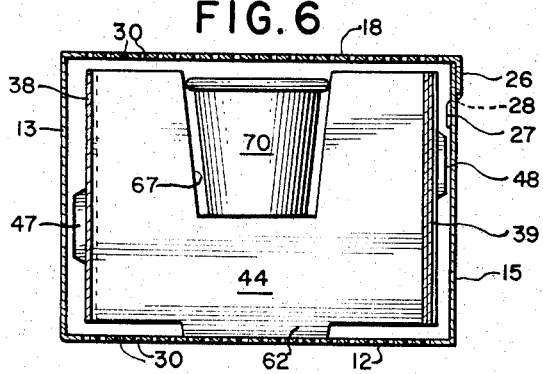

FIGS. 5 and 6 are sectional views as seen from lines 5—5 and 6—6, respectively, in FIG. 1.

The carton disclosed in the drawing includes an outer body structure 10 having a bottom wall 12 and upstanding peripheral side walls 13, 14, 15 and 16 hinged to the edges of the bottom wall and to each other at the corners of the carton. Thus, an open top tray is defined, and a top wall 18 is hinged to the rear side wall 13 adapted to overlap and close the top of the tray body. Dust flaps 20 and 21 hinged to the top edges of side walls 14 and 16, respectively, are adapted to overlap the top wall 18. Tabs 22 and 23 formed at the free edges of the dust flaps 20 and 21, respectively, are inserted into aligned openings 24 and 25 in the top wall for locking the dust flaps in place. An outer front wall flap 26 is hinged to the front edge of the top wall 18 and overlaps the front side wall 15 of the body 10, and a tab 27 at its lower edge cooperates with opening 28 in the front wall to hold the flap closed.

The top wall 18, rear wall 13, bottom wall 12 and front wall 15 each has provided therein a plurality of openings or perforations 30 which are large enough to permit the transfer of air into and out of the defined carton enclosure but are too small to permit the escape of insects from the carton.

At least one insert 36 is positioned in the carton body and includes a plurality of panels which are spaced apart and from the body wall structure. The separate panels in the insert add to the interior wall area of the carton to greatly increase the effective interior surface area upon which the insects can adhere. Each insert 36 thus includes opposed end panels 38 and 39 interconnected by outer transverse panels 42 and 43 and intermediate transverse panels 44 and 45. Preferably, end panels 38 and 39 are of equal lengths, and the transverse panels 42–45 are of equal length and are parallel to one another to define rectangular tubular structures.

Figure 3:
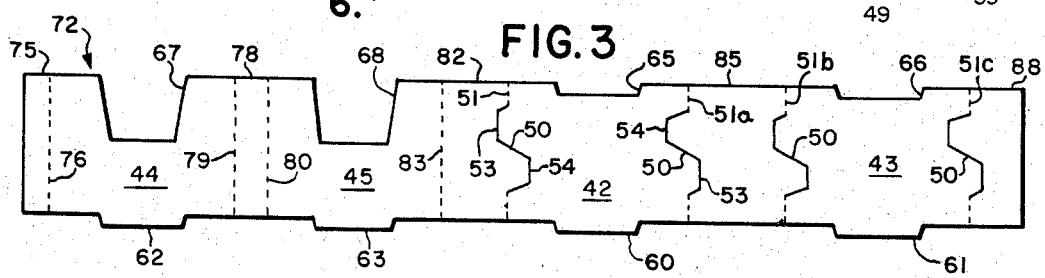
FIG. 3 is a top plan view of a blank suitably cut and scored to define the insert disclosed in FIG. 2.

Tab extensions 46, 47, 48 and 49 are formed at the corners of the insert and act to maintain the insert panels in inwardly spaced relationship to the body side walls. Each tab extension is formed typically in the flat condition of the blank (FIG. 3) by an S shaped cut line 50 between the respective hinge lines 51 between the adjacent end and outer transverse panels to provide two extensions for each corner. Thus, one tab 53 is typically intergral with the transverse panel and coplanar thereto and is cut from the adjacent end panel, and the other tab 54 is typically integral with the end panel and coplanar thereto and is cut from the adjacent transverse panel.

Similarly, tab extensions 60, 61, 62 and 63 are formed, respectively, from the lower edges of the tranverse panels 42–45 and act to maintain the remaining bottom edge of the insert elevated from the bottom wall 12. This permits migration of the insects between opposite sides of any of the panels.

The tranverse panels have recesses 65, 66, 67 and 68, respectively, cut therein which are suitably located relative to the lower tab extensions to permit complete nesting of adjacent strips for separate inserts. Additionally, the recesses 67 and 68 of the intermediate transverse panels are considerably deeper than the recesses formed on the outer transverse panels to permit the positioning and support thereon of a cup shaped container 70. This container 70 can be filled with appropriate food for the insects to permit them to survive in transit. By supporting the container by the intermediate transverse walls only, the container is cushioned and is locked in place relative to the insert.

The insert is formed from an elongated blank 72 (FIG. 3) that includes the previously mentioned transverse panels 42, 43, 44 and 45 which are of full width dimension and which are separated from each other by shorter panels adapted to be lapped with one another for forming the end panels 38 and 39. Thus, lap panel 75 is connected across hinge line 76 to one side of intermediate transverse panel 44 and a second lap panel 78 is conected across hinge line 79 to the opposite side of panel 44 and across hinge line 80 to the intermediate transverse panel 45. A third lap panel 82 is connected across hinge line 83 to the opposite side of the intermediate transverse panel 45 and across a typical hinge line 51 to the outer transverse panel 42. Additional lap panels 85 and 88 are connected across the typical hinge connections 51a, 51b and 51c to the outer trasnverse panels 42 and 43 and to the outer transverse panel 43, respectively.

Figure 2:
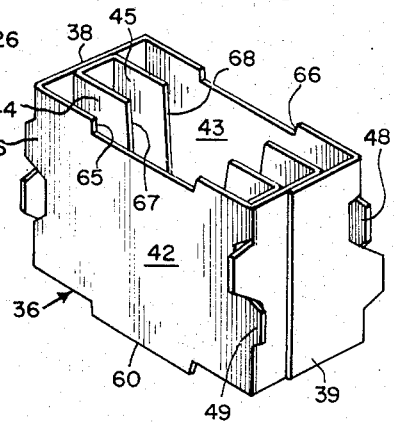
FIG. 2 is a perspective view of a carton insert used in the subject carton construction.

The insert is formed by initially applying adhesive to the facing side of panel 75 (FIG. 3) and by folding the lap panels 75 and 78 as well as the intermediate transverse panel 44 about the hinge line 80 to secure the panel 75 to panel 82. Thereafter, and then facing side of the panel 78 has adhesive applied thereto and all the panels to the left (FIG. 3) of the hinged line 51 are folded to secure the panel 78 to panel 85. The facing side of panel 88 has adhesive applied thereto and the outer transverse panel 43 and the panel 88 are folded about the working score 51c to secure panel 88 to the panel 82. The insert is thus fabricated and is flat, but can be opened to the opened arrangement shown in FIG. 2.

What is claimed is:

1. A carton providing a habitat for insects, comprising the combination of:
    (a) a body structure having a bottom wall, peripheral front, rear and end walls hinged at their bottom edge to the bottom wall, and a top wall hinged to the rear wall and adapted to overlap the remaining peripheral walls for closing the body structure;
    (b) an insert disposed within the body structure and having a pair of outer transverse panels and a pair of opposed end panels interconnecting the opposite ends of the outer transverse panels, and further including at least one intermediate transverse panel hinged at its opposite ends to the end panels and extending parallel to and between the outer transverse panels;
    (c) corner tab extensions integral with the end and outer panels cut, respectively, from the adjacent outer and end panels, constituting a means to abut the body structure side walls to maintain said insert end and outer panels spaced therefrom;
    (d) said insert being formed from an elongated strip of paperboard having a width slightly less than the height of the body structure side walls and being divided by substantially parallel hinge lines crosswise of the strip into the transverse and end panels;
    (e) bottom tab extensions formed on the outer and intermediate transverse panels near their respective centers operable to abut the body structure bottom wall to maintain the remaining portions of the transverse panels and the end panels spaced from said bottom wall;
    (f) the top edges of said intermediate and outer transverse panels being relieved to provide a means for the receipt and support thereon a food container suitable for the insects and these areas of relief all being opposite the bottom tab extensions to provide that nesting occurs, during fabrication, between adjacent strips of separate inserts;
    (g) said body structure having at least one of its walls perforated with a plurality of openings of sufficient size to permit the passage of air therethrough but of insufficient size to permit the passage of the insects therethrough.

2. A carton according to claim 1, wherein side closure flaps are hinged to the upper edges of the body structure side walls adapted to be folded over and overlap the top wall, wherein each side closure flap has a tab thereon suitable to be inserted into a respective cooperating opening in the top wall.

3. A carton according to claim 1, wherein a front closure flap is hinged to the front edge of the top wall suitable to be folded over and overlap the front side wall, and wherein a tab is formed on the front closure flap suitable to be inserted into a cooperating opening in the body structure front side wall.

4. A carton according to claim 3, wherein side closure flaps are hinged to the body structure side walls adapted to be folded over the top wall, and wherein each side closure flap has a tab thereon suitable to be inserted into a cooperating receiving opening in the top wall.

5. An insert to be used in a carton for insects, comprising a combination of:
    (a) a pair of outer transverse panels, a pair of opposed end panels interconnecting the opposite ends of the outer transverse panels, and at least one intermediate transverse panel hinged at its opposite ends to the end panels and extending parallel to and between the outer transverse panel;
    (b) said insert being formed from an elongated strip of paperboard having a width slightly less than the height of the carton and being divided by substantially parallel hinged lines crosswise of the strip into the transverse and end panels;
    (c) said transverse panels being single ply and said end panels being multiple ply including lap joints for securing the intermediate transverse panel and the ends of the paperboard strip to the end panels;
    (d) corner tab extensions integral with the end and outer transverse panels cut, respectively, from the adjacent outer transverse and end panels;
    (e) said corner tab extensions being formed in the flat condition of the paperboard strip by an S shaped cut line through the paperboard between the opposite ends of respective hinge lines between the adjacent outer transverse and end panels and extending to opposite sides of the hinge line;
    (f) the bottom contour of the paperboard strip being irregular to provide that only local selective contacts are made between the insert and the supporting carton surface therebeneath;
    (g) said insert having cut therefrom in the area of the intermediate transverse panel a recess to provide a means to receive therein a container for food, so that the insert can support and cushion said food container within the carton.

6. An insert according to claim 5, wherein the top contour of the paperboard strip is irregular at locations corresponding to and in the opposite sense to the irregular bottom control to permit nesting, during fabrication of adjacent paperboard strips for separate inserts.

References Cited

UNITED STATES PATENTS

| | | | |
|---|---|---|---|
| 1,222,753 | 4/1917 | Garean | 229—14 |
| 2,231,982 | 2/1941 | Zalkind | 229—14 |
| 2,280,544 | 4/1942 | Schaefer | 119—19 |
| 2,970,565 | 2/1961 | Reynolds | 119—17 |
| 3,015,428 | 1/1962 | Magazzu | 229—14 |
| 3,086,498 | 4/1963 | Reynolds et al. | 119—17 |
| 3,108,569 | 10/1963 | Kundikoff | 119—19 |
| 3,122,127 | 2/1964 | Shechmeister et al. | 119—18 |
| 3,245,602 | 4/1966 | Bovard | 229—14 |
| 3,279,677 | 10/1966 | Wojcik | 229—14 |
| 3,326,186 | 6/1967 | Doll | 119—19 |

ALDRICH, F. MEDBERY, *Primary Examiner.*